United States Patent
Valli et al.

(10) Patent No.: US 12,249,019 B2
(45) Date of Patent: Mar. 11, 2025

(54) SYSTEMS AND METHODS FOR FORMING FOLDED FOCAL PLANES

(71) Applicant: Adeia Guides Inc., San Jose, CA (US)

(72) Inventors: Seppo Valli, Espoo (FI); Pekka Siltanen, Helsinki (FI)

(73) Assignee: Adeia Guides Inc., San Jose, CA (US)

( * ) Notice: Subject to any disclaimer, the term of this patent is extended or adjusted under 35 U.S.C. 154(b) by 0 days.

(21) Appl. No.: 18/071,119

(22) Filed: Nov. 29, 2022

(65) Prior Publication Data

US 2024/0177398 A1 May 30, 2024

(51) Int. Cl.
*G06T 15/04* (2011.01)
*G06T 15/50* (2011.01)

(52) U.S. Cl.
CPC ............ *G06T 15/04* (2013.01); *G06T 15/503* (2013.01)

(58) Field of Classification Search
CPC ......... G06T 7/0004; G06T 2207/20081; G06T 7/11; G06T 2207/10024; G06T 7/13; G06T 2207/20021; G06T 7/40; G06T 2207/20016; G06T 7/90; G06T 2207/10004; G06T 2207/10016; G06T 2207/10081; G06T 2207/20012; G06T 2207/20104; G06T 2207/20084; G06T 7/136; G06T 2207/30148; G06T 5/20; G06T 5/73; G06T 7/0012; G06T 7/45; G06T 1/0021; G06T 2207/20028; G06T 2207/20064; G06T 2207/20152; G06T 2207/20221; G06T 2207/30096; G06T 2207/30124; G06T 5/70; G06T 7/0002; G06T 7/60; G06T 7/73; G06T 7/80; G06T 15/205; G06T 2207/10048; G06T 2207/10088; G06T 2207/20024; G06T 2207/20056; G06T 2207/20164;
(Continued)

(56) References Cited

U.S. PATENT DOCUMENTS

| | | | |
|---|---|---|---|
| 8,502,821 B2 * | 8/2013 | Louise | G06T 15/80 345/422 |
| 2015/0205126 A1 * | 7/2015 | Schowengerdt | G06T 15/00 345/633 |

(Continued)

OTHER PUBLICATIONS

Cui et al. "Optical mapping near-eye three-dimensional display with correct focus cues," Opt Lett., 42:2475-8 (2017) (4 pages).
(Continued)

*Primary Examiner* — Ming Wu
(74) *Attorney, Agent, or Firm* — Haley Guiliano LLP (57) ABSTRACT

Systems and methods for rendering a 3D image are provided. The system receives image data including a texture matrix and a corresponding depth matrix. The system generates a first weight matrix based on a number of least significant bits of each depth value of the depth matrix. The system generating a second weight matrix that is a complement of the first weight matrix. The system generates the first folded focal plane matrix by applying weights of the first weight matrix to the texture matrix. The system generates the second folded focal plane matrix by applying weights of the second weight matrix to the texture matrix. The system provides the first and the second folded focal planes matrices to a display device for generating a 3D representation of the received texture matrix.

20 Claims, 9 Drawing Sheets

(58) Field of Classification Search
CPC . G06T 2207/30056; G06T 2207/30068; G06T 2207/30164; G06T 2207/30248; G06T 3/04; G06T 5/10; G06T 5/50; G06T 7/10; G06T 7/187; G06T 7/33; G06T 7/62; G06T 11/001; G06T 15/00; G06T 2207/10008; G06T 2207/10032; G06T 2207/10104; G06T 2207/20052; G06T 2207/20076; G06T 2207/30036; G06T 2207/30061; G06T 3/40; G06T 3/4007; G06T 3/4038; G06T 5/80; G06T 5/92; G06T 7/001; G06T 7/12; G06T 7/162; G06T 7/174; G06T 7/194; G06T 7/215; G06T 7/344; G06T 7/48; G06T 9/00; G06T 9/40

See application file for complete search history.

(56) References Cited

U.S. PATENT DOCUMENTS

2017/0142398 A1* 5/2017 Peterson .............. H04N 13/261
2018/0220589 A1* 8/2018 Burden ................. A01G 3/085

OTHER PUBLICATIONS

Hua, "Enabling focus cues in head-mounted displays," in Imaging and Applied Optics 2017, OSA Technical Digest (20 pages).

K. Akeley, et al., "a stereo display prototype with multiple focal distances," CM Trans. Graph. 23, 3, 804-813 (2004).

U.S. Appl. No. 17/863,793, "Systems and Methods for Reducing a Number of Focal Planes Used to Display Three-Dimensional Objects," filed Jul. 13, 2022.

U.S. Appl. No. 17/990,023, "System and Method for Preprocessing of Focal Planes Data for Rendering," filed Nov. 18, 2022.

Valli et al., "Advances in Spatially Faithful (3D) telepresence. IntechOpen, 2021," Augmented Reality and Its Application, IntechOpen, DOI: 10.5772/intechopen.99271 (24 pages).

Zhan et al., "Multifocal displays: review and prospect," PhotoniX 1:10 (2020) https://doi.org/10.1186/s43074-020-00010-0.

* cited by examiner

```
1100
1101    Input {Texture_Matrix, Depth_Matrix}
1102
1103    //Create Weight matrices
1104
1105    Initialize Weight_Matrix_1, size = Depth_Matrix.size
1106    Initialize Weight_Matrix_2, size = Depth_Matrix.size
1107
1108    For i=1: Depth_Matrix.Lenth
1109        For j=1: Depth_Matrix.Width
1110            Weight_Matrix_1 (i,j) = last LSBs of Depth_Matrix(i,j))
1111            Weight_Matrix_2 (i,j) = Inverse (Weight_Matrix_1(i,j)))
1112
1113    //Create Control matrix
1114
1115    Initialize Control_Matrix, size = Depth_Matrix.size
1116
1117    For i=1: Control_Matrix.Lenth
1118        For j=1: Control_Matrix.Width
1119            Control_Matrix_1(i,j) = first MSBs of Depth_Matrix (i,j))
1120
1121    //Create Focal Planes matrices
1122
1123    Initialize Focal_Matrix_1, size = Texture_Matrix.size
1124    Initialize Focal_Matrix_2, size = Texture_Matrix.size
1125
1126    Focal_Matrix_1 = Texture_Matrix weighed by Weight_Matrix_1
1127    Focal_Matrix_2 = Texture_Matrix weighed by Weight_Matrix_2
1128
1129    //Output
1130    Output: {Focal_Matrix_1, Focal_Matrix_2, Control_Matrix}
```

SYSTEMS AND METHODS FOR FORMING FOLDED FOCAL PLANES

BACKGROUND

This disclosure is generally directed to display of three-dimensional objects through multiple focal planes. In particular, methods and systems are provided for generation of folded focal planes using depth blending techniques.

SUMMARY

Head-mounted displays are frequently used in virtual reality (VR) and extended reality (XR) applications to provide three-dimensional (3D) images to a user through one or more near-eye display screens that presented to the eyes of the user to create a stereoscopic 3D effect. Generally, stereo displays may provide incorrect focus cues because light comes from a single surface, which may cause eye fatigue and/or discomfort.

In one approach, a depth-blending algorithm is used to generate multiple focal planes (MFPs) that are simultaneously displayed, e.g., using a stack of transparent displays and/or using spatial light modulators that are capable of rendering image content to varying distances, controlled by tailored phase functions. Displays using MFPs may allow more natural eye focusing and adjustment.

The term "spatial light modulator" ("SLM") device refers to any suitable programmable pixel-by-pixel spatial light modulator device or any other suitable opto-electronic device or device component capable of locally directing and focusing light to different depths. In some embodiments, an SLM device works by directing light pixel by pixel, however other less precise SLM device may also be used. In some embodiments, an SLM device may also refer to a grid of parallel SLMs, or a series of SLMs rendering content in successive steps.

For example, to achieve depth-blending of any set of voxels (e.g., a set of voxels of a frame of 3D media content), the voxels may be rendered at set different distances to create blended pixels at any depth. If a voxel of the frame happens to be mapped exactly to a focal plane, then voxel representation is displayed by lighting up a single location at a single distance. If a voxel of the frame does not map exactly to a focal plane, the rendering system will render such a voxel as a blended pixel using a plurality of closest display planes (e.g., two closest display panels). Example lineal blending functions are described in, e.g., K. Akeley, et al., "a stereo display prototype with multiple focal distances," CM Trans. Graph. 23, 3, 804-813, 2004 which is incorporated herein, in its entirety. When viewed together, the two blended pixels create a perception representation for the voxel of the 3D media content. In one approach, an MFP display may use a SLM to locally adjust the focus to follow the depth of the virtual objects. In this approach, the rendering system generates a phase function for each individual pixel based on its depth value. The SLM uses phase functions to shift each displayed pixel to its target focal plane/distance.

For example, in a case where there are only two planes that generate blended voxels, the depth blending between the two focal planes is determined according to the following equation:

$$L_0 = L_1(z) + L_2(z) = w_1(z)L_0 + w_2(z)L_0.$$

where $w_1$ and $w_2$ are depth-weighted fusing functions. The perceived depth $\hat{z}$ of the fused voxel may be considered as a function of the depth-weighted fusing functions: $\hat{z} = f(w_1, w_2)$, where a simple approximation function may be the weighted sum of the depths of the two focal planes: $\hat{z} = w_1(z)z_1 + w_2(z)z_2$ In one approach, when an SLM device is used, an optical component may be used to modulate the amplitude, phase, or polarization of a light wave. The light wave may be controlled by an array of pixels, each of which can individually control the phase or amplitude of the light passing through it (transmissive SLM) or reflecting off it (liquid crystal on silicon SLM). The pixel pattern may be defined by a phase function that defines optical properties of the light modulated by the SLM. The phase functions may determine the tilt (inclination) of individual liquid crystals. Spatially varying the tilt, e.g., by changing the angles of neighboring crystals, may correspond to a changing curvature of a lens. The effects change the path of the incoming light so that the light is shifted (translated) or focused to a desired spatial position and distance away from the SLM device. In another approach, each focal plane may be generated for display on a respective display of a stack of displays.

When implementing an MFP-rendering device, using many display planes/elements will result in higher rendering quality. However, to reduce computational complexity needed to render, the number of display planes/elements may be reduced. One approach to reducing the amount of display planes is describe in detail in U.S. patent application Ser. No. 17/863,793, "SYSTEMS AND METHODS FOR REDUCING A NUMBER OF FOCAL PLANES USED TO DISPLAY THREE-DIMENSIONAL OBJECTS," (the "'793 application"), which is incorporated herein in its entirety. In particular, the '793 application describes reducing pixel matrices to just two focal plane matrices (e.g., folded focal planes or FFPs) than can then be used to render a 3D image using depth-blending techniques. However, the described techniques can function with any reduced set of folded focal planes. While this technique results in high quality and reduces set of focal plane matrices, the technique is computationally intensive since it requires initial generation of large numbers of focal plane matrices which are only then reduced. Techniques for further improving display of folded focal planes is disclosed in U.S. patent application Ser. No. 17/990,023, "SYSTEM AND METHOD FOR PREPROCESSING OF FOCAL PLANES DATA FOR RENDERING," which is incorporated herein in its entirety.

To help address this problem, techniques are provided herein that can be used to generate an equivalent or near equivalent reduced set of folded focal plane matrices, without the initial generation of multiple focal planes. More particularly, e.g., two folded focal plane matrices may be generated from an input of texture and depth matrices of an image that closely resemble folded focal planes generated using a technique described in the '793 application.

For instance, an advantageous effect is achieved by applying weights to a texture matrix, where the weights are based on a number of least significant bits ("LSB") of the depth matrix (e.g., 6 least significant bits) to generate a first plane matrix. Separately, a second set of plane matrices is created by applying a complement of those weights to the same texture matrix. For example, a rendering application may generate a first weight matrix based on a number (e.g., 5 or 6) of LSBs of each depth value of the depth matrix. The rendering application may generate a second weight matrix that is the complement of the first weight matrix. The rendering application then generates the first focal plane matrix by applying weights of the first weight matrix to the texture matrix. The rendering application then generates the second focal plane matrix by applying weights of the second weight matrix to the texture matrix.

The two generated focal planes matrices are then provided to a spatial display device to generate for display a 3D representation of the received texture matrix (e.g., as folded focal planes). For example, a 2D display device may generate light corresponding to the two generated focal planes matrices tiled together. The SLM device may then project the tiled image into correct planes before the end result is collected by a lens and projected to a human eye to create a 3D image. In some embodiments, the rendering application may also generate a focal control matrix based on residual most significant bits ("MSB") (e.g., 2 bits) of the depth matric values. The control may be used to adjust the setting of the SLM device so that folding of is reversed optically. In some embodiments, the two generated focal planes may be generated on each of two respective stacked displays.

Such techniques allows for quick processing of standard texture and depth data to quickly generated focal planes matrices for multi-plane displays, that allow for display of weighted voxels in two planes to create an appearance of a 3D object. The use of weights based on LSBs of the depth data (and complement of those weights) allows for creation of an effective appearance of much larger number of focal planes without the associated computationally intensive computation.

DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1A:
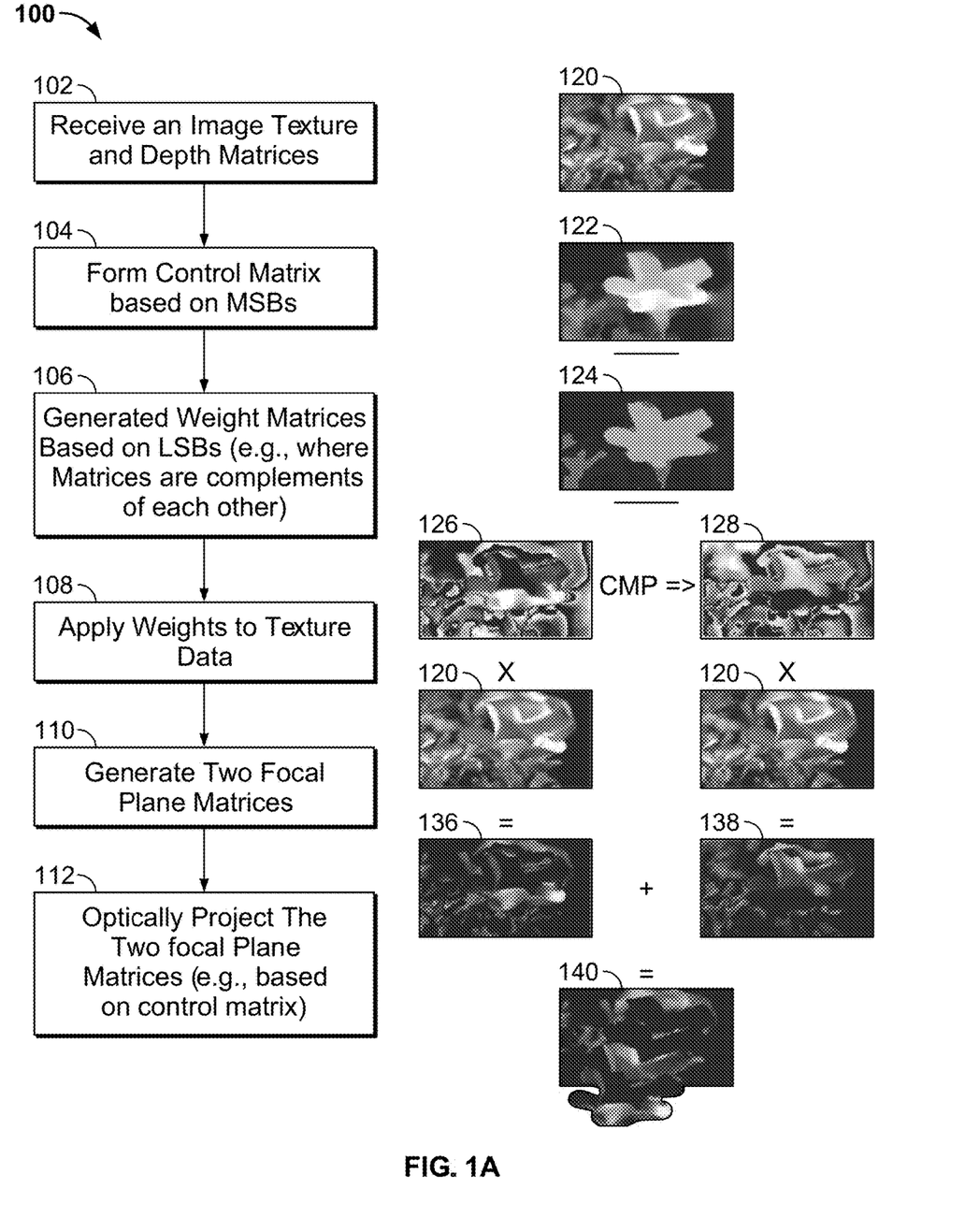
FIG. 1A depicts an example method for rendering a 3D image, in accordance with some embodiments of this disclosure.

FIG. 1A depicts an example method 100 for rendering a 3D image, in accordance with some embodiments of this disclosure.

At step 102, rendering application of a rendering system receives image data. For example, image data may comprise a frame of a video (e.g., 3D video) or other media content (e.g., 3D video game, 3D video conference, a 3D virtual or digital representation of a real-world space, etc.). In some embodiments, image data may include a texture matrix 120 and depth matrices 122 for the image data. For example, the texture matrix may be a table comprising luminance and/or color (e.g., RGB) matrix, where each cell in the matrix represents brightness (or luminance) and color of a single pixel. The depth matrix may be a matrix (of the same size as the texture matrix) that defines depth for each of the pixels in the texture matrix. The term matrix may refer to any data that is formed as an array of values of any arbitrary size.

In some embodiments, at step 104, the rendering application forms a focal control matrix 124 of the image data. In some embodiments, the control matrix is based on a certain number of MSB of the depth matrix 122. For example, if 2 MSBs are used, bits other than 2 MSBs may be changed to zeros. In one example, depth bit value "1111 0101" would become "1100 0000," depth bit value "0101 1101" would become "0100 0000" (e.g., bits other than leading two bits would be set to zero). While the matrices with 8 bits of data in each cell are provided here as an example, one skilled in the art would appreciate that any size of data may be processed in a similar way. In one example, the matrices may have 16 bits of data in each cell. In another example, the matrices may have 32 bits of data in each cell. In yet another example, the matrices may have $2^n$ bits of data in each cell where n is any integer. In the exemplary description of the procedure shown in FIG. 1A, the convention for representing a depth matrix is that small values correspond to long distances. In some embodiments, the exemplary algorithm of FIG. 1A may be primed with an opposite convention (i.e., that a small distance shows up as a small value).

In some embodiments, at step 106, the rendering application forms two weight matrices based on a certain number of LSBs (e.g., 6 or 5) of the depth matrix 122. In one approach, the number of LSBs is residual to the number of MSBs used for the focal control matrices 124. That is, for 8-bit matrices, if 2 MSBs were used for a control matrix, 6 LSBs are used for the weight matrix; if 3 MSBs were used for a control matrix, 5 LSBs are used for the weight matrix, etc.

In some embodiments, the first weight matrix 126 is based on a certain number of LSB of the depth matrix 122. For example, if 6 LSBs are used, bits other than 6 LSBs may be changed to zeros. In one example, depth bit value "0111 0010" would become "0011 0010", depth bit value "1100 0110" would become "0000 0110" (i.e. the leading two bits would be set to zeros).

In some embodiments, the second weight matrix 128 is a complement of the first weight matrix 126. In some embodiments, the term "complement" to matrix may herein refer to a counterpart matrix to the initial matrix, such that the sum of the matrix and a complement matrix results in a matrix with a value of "1" in each position. In some embodiments, the term complement matrix may refer to one's complement matrix. In some embodiments, the term complement matrix may refer to 255's complement matrix (e.g., for 8-bit value matrix). In some embodiments, the term complement matrix may refer to $(2^n)-1$ complement matrix where n is any integer (e.g., for n-bit value matrix). For example, to generate the second weight matrix 128, the rendering application may subtract each value of the first weight matrix 126 from bit value "1111 1111" (255 in decimal). For example, value depth bit value "0111 0010" (114 in decimal) in the first weight matrix 126 would become 1111 1111-0111 0010=0100 01101 (141 in decimal). Similar inversion may be performed for data larger or small than 8 bits (e.g., subtraction from 1111 1111 1111 1111 may be used for data bit-length 16).

As mentioned above, any split between MSB and LSB of an 8-bit data filed can be used. The use of different splits results in different effective focal planes, as shown in Table 1 below.

TABLE 1

| MSBs | LSBs | Resulting No. of Focal Planes (MFP) |
| --- | --- | --- |
| 0 | 8 | 1 |
| 1 | 7 | 2 |
| 2 | 6 | 5 |
| 3 | 5 | 9 |
| 4 | 4 | 17 |
| 5 | 3 | 33 |
| 6 | 2 | 65 |
| 7 | 1 | 129 |
| 8 | 0 | 1 |

One skilled in the art would appreciate that similar splits into LSBs and MSBs can be done for any bit sizes of data fields in the depth matrix 122.

In some embodiments, at step 108, the rendering application applies the weights matrices 126, 128 to the texture matrix 120. For example, luminance values of the texture matrix 120 may be (e.g., multiplied) to corresponding values of the weight's matrix 126 to create focal plane matrix 136. In parallel, luminance values of the texture matrix 120 may be scaled (e.g., multiplied) to corresponding values of the weight's matrix 128 to create focal plane matrix 138. In some embodiments, if the texture matrix 120 includes both luminance value and color values, only the luminance values are weighted, while color values are retained. For example, the luminance values may be extracted, weighted using the weight matrices 126, 128, and recombined with the color values. The scaling may also involve initial division by 255 (or other largest value for given data bit size) before multiplication by the weight value (e.g., to keep the final value in 0-255 range).

In some embodiments, at step 110, the rendering application stores the formed matrices 136 and 138 as two focal plane matrices.

In some embodiments, at step 112, the rendering application optically projects the two folded focal plane matrices 136, 138 to generate a 3D image for the input data 120, 122. For example, light based on the two folded focal plane matrices (e.g., tiled together) may be projected into SLM device that is configured using the control matrix 124 (e.g., as further discussed in FIG. 4). In some embodiments, the rendering application may use systems and methods described in the '793 application to generate a 3D images using the two folded focal planes matrices 136, 138. In another example, two focal plane matrices may be used to generated pixels on respective displays of a display device with two stacked displays.

Figure 1B:
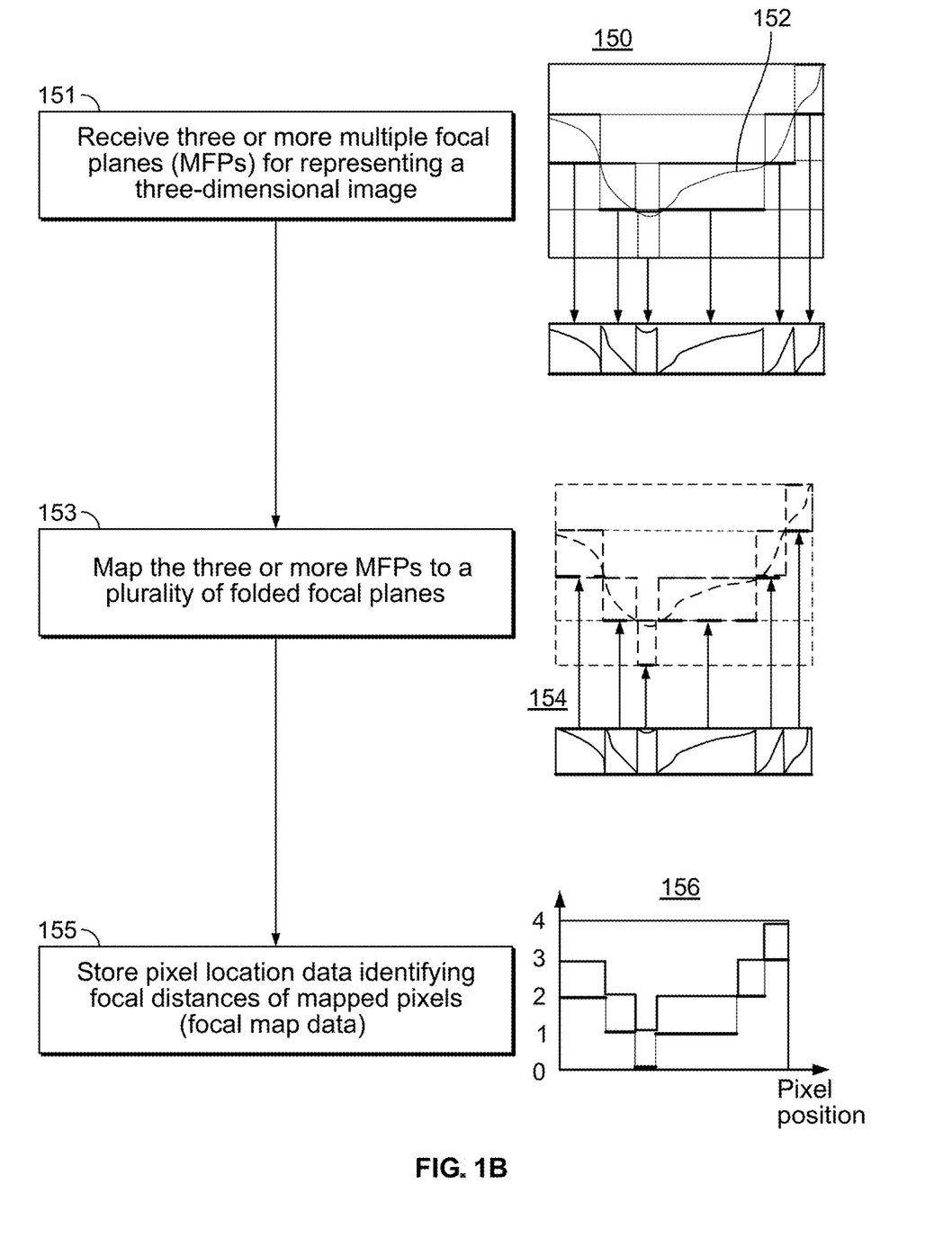
FIG. 1B depicts an example method for reducing a number of focal planes for display of a three-dimensional image, in accordance with some embodiments of this disclosure.

FIG. 1B depicts an example method for reducing a number of focal planes for display of a three-dimensional image, in accordance with some embodiments of this disclosure. In particular, FIG. 1B depicts an example method for reducing a number of focal planes for display of a three-dimensional image. At step 151, three or more multiple focal planes (MFPs) for representing a three-dimensional image are received. The focal planes may be implemented using a stack of displays, with each display corresponding to one of the planes. The MFPs may be generated from data representing a three-dimensional image (e.g., a 3D frame of 3D media content) using a depth-blending algorithm. In some embodiments, the MFPs are received from an external computing device.

MFPs 150 comprise a graphical representation of a cross-section of a three-dimensional image displayed across a plurality of focal planes. Curve 152 depicts the intended appearance of focal depths of the cross-section of the three-dimensional. Each section of curve 152 is represented by pixel values on one or more focal planes. For instance, the first section of curve 152 is generated from pixel luminance values on the third and fourth focal planes from the front (bottom) with the location of a pixel of the final image being dependent on a magnitude of the luminance values of that pixel in the third focal plane and the fourth focal plane. In some instances, a pixel luminance value may only exist on one focal plane, such as at the locations where the line crosses focal planes. In some instance, a pixel luminance value may exist across more than two focal planes, such as when a depth blending algorithm that is used to generate the MFPs blends a pixel value across more than two focal planes.

At step 153, the first plurality of focal planes is mapped to a second plurality of folded focal planes. The second plurality of folded focal planes to which the first plurality of focal planes comprises at least one less focal plane than the first plurality of focal planes. In some embodiments, the first plurality of focal planes is mapped to a total of two folded focal planes, such as when pixel luminance values for any given pixel location only exist on a maximum of two focal planes.

FIG. 1B depicts an implementation where five focal planes (e.g., as received at step 151) are mapped down to two folded focal planes (e.g., matrices 136, 138). Each portion of the curve 152 is represented in the five focal planes 150 as pixel luminance values on a maximum of two folded focal planes. For each pixel location with pixel luminance values in two focal planes, the pixel luminance value of the backmost folded focal plane is mapped to the first of mapped focal planes 154 and the pixel luminance value of the frontmost folded focal plane is mapped to the second of the mapped focal planes.

At step 153, each pixel location with a pixel luminance value in only one of the focal planes, the pixel luminance value is mapped to one of the backmost folded focal plane or frontmost folded focal plane according to some embodiments. In some approaches, the backmost folded focal plane or frontmost folded focal planes 154 are generated as described with respect to FIG. 1A based on focal planes data 150.

At step 155, focal map data, i.e., pixel location data identifying focal distances of mapped pixels is stored. For example, the rendering application may store, for each mapped pixel, data identifying a focal plane from which the pixel was mapped. Graph 156 (a pixel row of a control matrix 124) depicts a graph that of pixel location values that identify a focal plane from which the pixels were mapped, starting at focal plane 0 and ending at focal plane 4. While pixel location values are depicted as identifying the focal plane, in other embodiments the pixel location values may comprise the focal distance of the mapped focal plane. Alternatively, the rendering application may store data identifying, for each focal plane, the focal distance of the focal plane. While FIG. 1C depicts the pixel location values as a graph, in some embodiments the pixel locations values are stored in a table and/or integrated into a phase function equation for rendering a three-dimensional image.

In addition to all shifted depth blended segments shown in FIG. 1B, focal distances (focal/rendering map) of the original MFP stack are stored to be used by the rendering application. Exemplary focal control data (focal map) is illustrated in chart 156. This data may be used by rendering application when re-rendering the two FFPs of FIG. 1B, e.g., as shown by arrows in charts 150 and 154. Accordingly, a focal map may refer to an image that contains pixel-by-pixel information of the focal plane that each FFP pixel originates from.

Figure 1C:
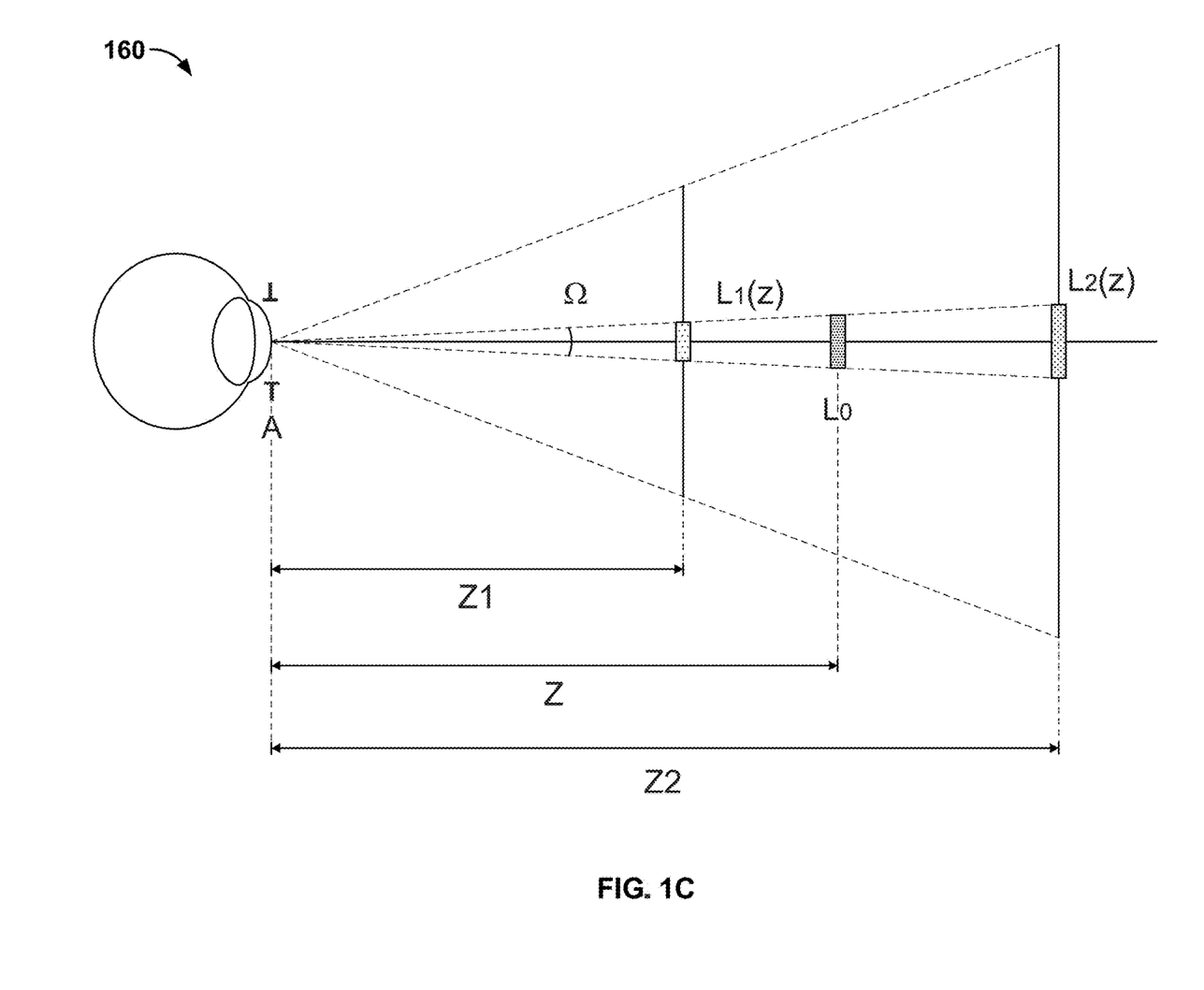
FIG. 1C depicts an example of depth blending techniques, in accordance with some embodiments of this disclosure.

FIG. 1C depicts an example of depth blending techniques, in accordance with some embodiments of this disclosure.

For example, in a case where there are only two planes ($L_1$ and $L_2$) that generate blended voxels, the depth blending 160 between the two focal planes may be determined according to the following equation:

$$L_0 = L_1(z) + L_2(z) = w_1(z)L_0 + w_2(z)L_0$$

where $w_1$ and $w_2$ are depth-weighted fusing functions. The perceived depth $\hat{z}$ of the fused voxel may be considered as a function of the depth-weighted fusing functions: $\hat{z} = f(w_1, w_2)$, where a simple approximation function may be the weighted sum of the depths of the two focal planes: $\hat{z} = w_1(z)z_1 + w_2(z)z_2$. The meaning of symbols if the equation above are demonstrated by FIG. 1C. In particular, A refers to aperture of the eye, $L_1$ and $L_2$ refer to planes for generating blended voxels at distances $z_1$ and $z_2$, $L_0$ refers to appearance point of the blended voxel at distance z. The symbol $\Omega$ refers to view angle from the eye through distances $z_1$ and $z_2$.

Figure 2:
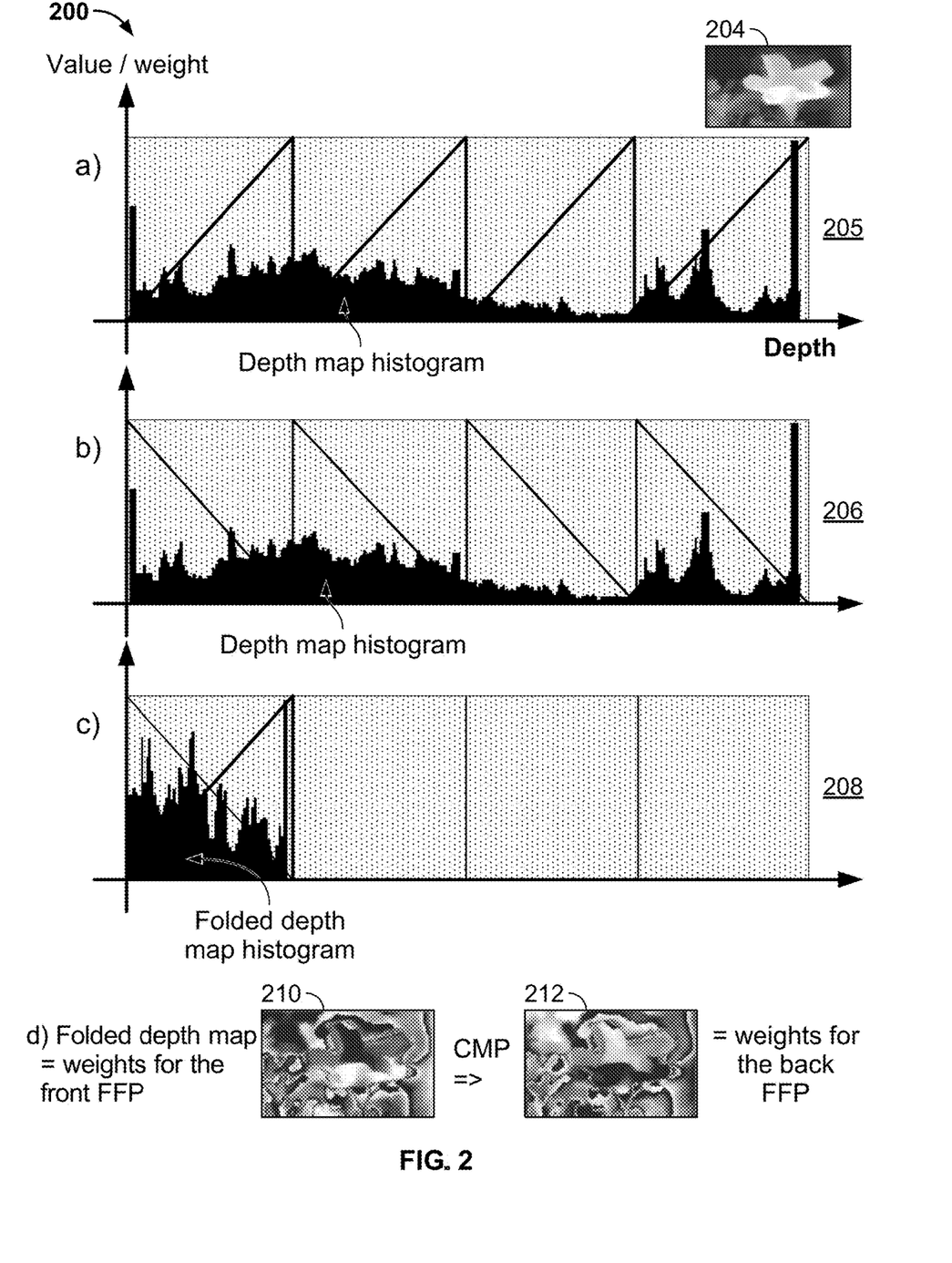
FIG. 2 depicts an example method for generating weights for texture matrix, in accordance with some embodiments of this disclosure.

FIG. 2 depicts an example method 200 for generating weights for texture matrix, in accordance with some embodiments of this disclosure. In some embodiments, weights generated as shown in FIG. 2 apply to initial input 120, 122 of FIG. 1A. For example, matrix 204 may be the same depth matrix as matrix 122, where the depth matrix provides depth data for respective pixels of texture data 120.

Diagram 205 shows a histogram of depth values from matrix 204. For example, depth value may vary from 0-255 and, the histogram shows how often each such depth value occurs. The sawtooth line shows a weight for respective pixel of texture data (e.g., texture matrix 120) based on the depth value. As shown, four periods are provided where the weight increase in a linear fashion, before restarting. However, in other embodiments, any number of such periods may be used (e.g., more periods to achieve more aggressive folding and less periods of less aggressive folding). The weights shown in diagram 205 can be applied to the texture matrix to form first focal plane matrix.

Diagram 206 also shows a histogram of depth values from matrix 204. For example, depth value may vary from 0-255 and, the histogram shows how often each such depth value occurs. The sawtooth line (which is an inverse of sawtooth line in diagram 205) shows a weight for respective pixel of texture data (e.g., texture matrix 120) based on the depth value. As shown, four periods are provided where the weight increase in a linear fashion, before restarting. However, in other embodiments, any number of such periods may be used (e.g., more periods to achieve more aggressive folding and less periods of less aggressive folding). The weights shown in diagram 205 can be applied to the texture matrix to form second focal plane matrix.

While the sawtooth function weight values can be applied directly to texture matrix, an alternative approach is shown in diagram 208. By removing first 2 MSBs (in little endian notation), the depth values become folded in range that is one quarter of the initial range. The weight values (shown by two lines) then become linear and are complements of each other. However, application of such weights (shown by two lines) to texture data would result in similar adjustment as application of saw-toothed function weights shown in diagrams 205 and 206. As the result of the respective application of the weights (shown by two polylines on diagrams 205 and 206) to texture data, two focal planes matrices are generated which can be used to project a 3D image e.g., as shown in element 140 of FIG. 1A and in FIG. 4 discussed below.

Figure 3:
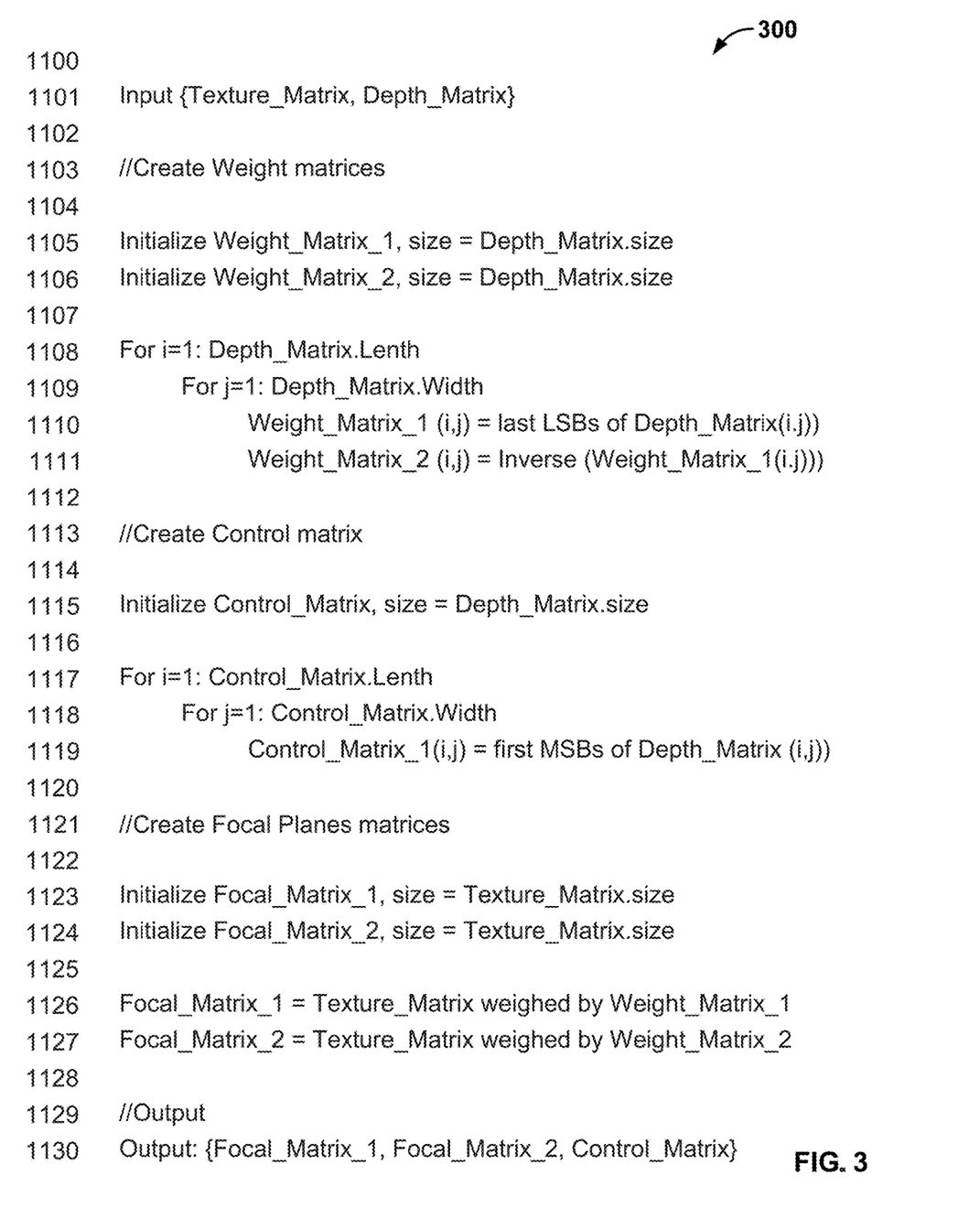
FIG. 3 depicts pseudocode for generation of two focal plane matrices, in accordance with some embodiments of this disclosure.

FIG. 3 depicts pseudocode 300 for generation of two focal plane matrices, in accordance with some embodiments of this disclosure. For example, the pseudocode may be used by rendering application to generate (when executed by a processor) two focal planes matrices that are used to project a 3D image e.g., as shown in element 140 of FIG. 1A and in FIG. 4 below.

At line 1101, the rendering application receives as input Texture Matrix (e.g., Texture_Matrix) and Depth Matrix (e.g., Depth_Matrix). In some embodiments, Depth Matrix may be converted to gray values.

At line 1105, the rendering application initializes first weight matrix (e.g., weight_matrix_1) with the same size as Depth Matrix. At line 1106, the rendering application initializes second weight matrix (e.g., weight_matrix_1) with the same size as Depth Matrix.

At lines 1108-1111, the rendering application iterates through each value of the Depth Matrix (by iterating via length and width) to set respective values of the first Weight Matrix to a predetermined number (e.g., 6) of last (when the binary numbers are stored in little endian notation) LSBs of the data in depth matrix.

At line 1111, the rendering application sets each of the values of the second weight matrix to complements of the respective value in the first weight matrix (e.g., by subtraction from 255 for 8-bit data).

At line 1115, the rendering application initializes control matrix (e.g., Control_matrix) with the same size as Depth Matrix.

At lines 1117-1119, the rendering application iterates through each value of the Depth Matrix (by iterating via length and width) to set respective values of the control matrix to a predetermined number (e.g., 2) of first (when the binary numbers are stored in little endian notation) MSBs of the data in depth matrix.

At line 1123-1124, the rendering application initializes first and second focal matrices (e.g., focal_matrix_1 and focal_matrix_2) with the same size as Texture Matrix.

At line 1126, the rendering application sets weights of the first focal matrix (e.g., focal_matrix_1) to the values in texture matrix, weighted by respective values in the first weight matrix.

In some embodiments, if the texture matrix was received in RGB format, the texture matrix may be converted to e.g. YCbCr format. Then luminance values of the YCbCr may be extracted and weighted by the respective values in the first weight matrix (e.g., by dividing each respective values by 255 and multiplying it by the weight to keep the result in 0-255 range). Then the luminance values may be re-combined with Cb (blue difference) and Cr (red difference) values, and the resulting weights YCbCr matrix may be converted back to RGB as the first Focal Matrix. Any other format that allows extraction of luminance values may be used instead of YCbCr.

At line 1127, the rendering application sets weights of the second focal matrix (e.g., focal_matrix_2) to the values in texture matrix (e.g., Control_matrix), weighted by respective values in the second weight matrix.

In some embodiments, if the texture matrix was received in RGB format, the texture matrix may be converted to e.g. YCbCr format. Then luminance values of the YCbCr may be extracted and weighted by the respective values in the second weight matrix (e.g., by dividing each respective values by 255 and multiplying it by the weight to keep the result in 0-255 range). Then the luminance values may be re-combined with Cb (blue difference) and Cr (red difference) values, and the resulting weights YCbCr matrix may be converted back to RGB as the second Focal Matrix. Any other format that allows extraction of luminance values may be used instead of YCbCr.

At line 1130, the rendering application outputs the first and second focal matrices and the control matrix. These matrices may be used to generate a 3D image as described in FIG. 4 below.

Figure 4:
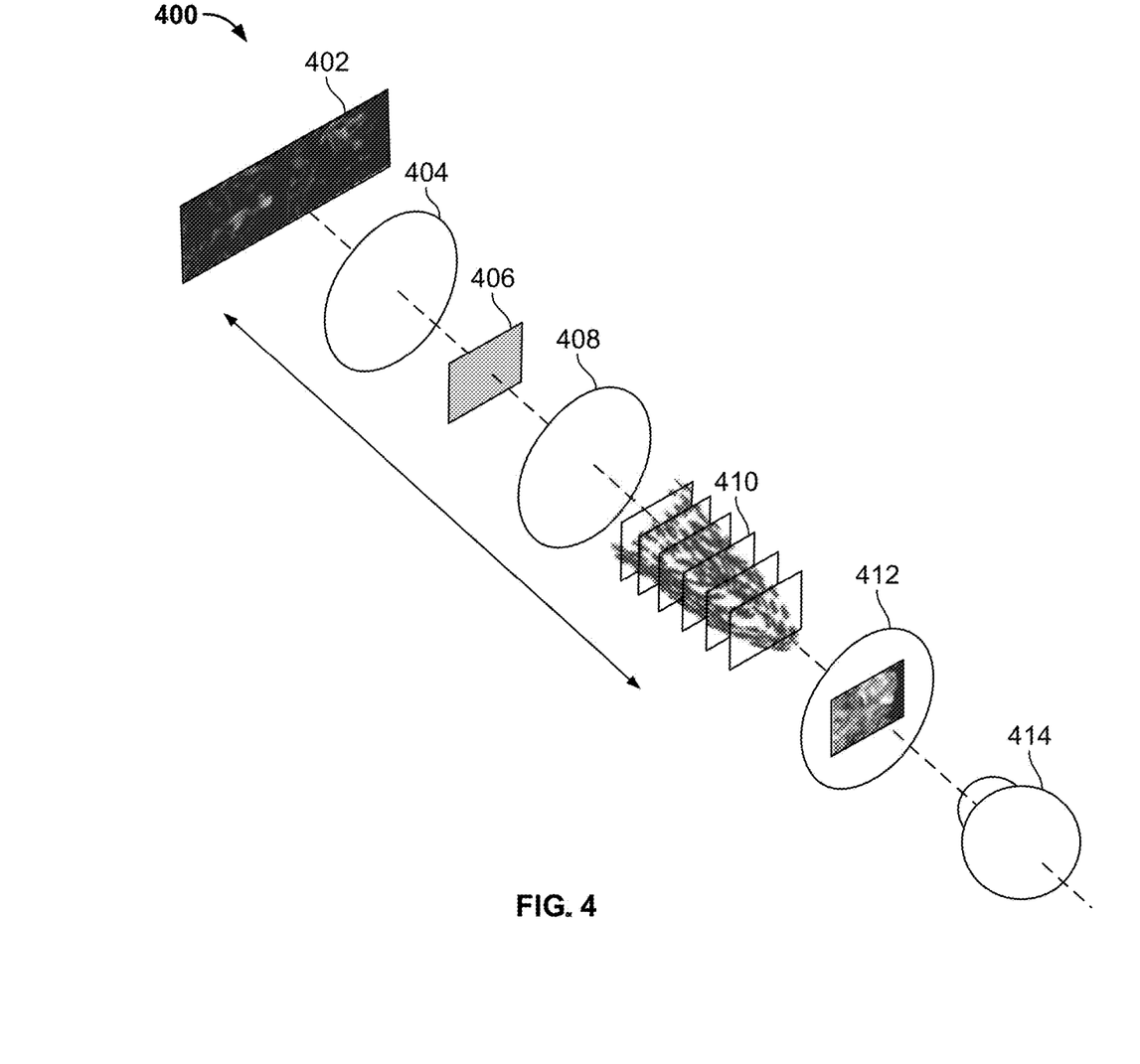
FIG. 4 depicts an example system for rendering an image using two focal plane matrices, in accordance with some embodiments of this disclosure.

FIG. 4 depicts an example system for rendering an image using two folded focal plane matrices (e.g., two folded focal plane matrices 136, 138 of FIG. 1 or two focal matrices generated as output in line 1130 of FIG. 3), in accordance with some embodiments of this disclosure. In particular FIG. 4 depicts an example system 400 that can be used to render an image using pixel values. Display screen 402 comprises a display configured to display the mapped pixel values. As depicted in FIG. 4, display screen 402 comprises two displays, one for each tiled mapped focal plane (e.g., folded focal planes 136, 138 of FIG. 1). In implementations where the pixel values are mapped to more than two focal planes, display screen 402 may be configured to display the higher number of focal planes. Light emanating from display screen 402 is collimated by lens 404. A spatial multiplexing unit (SMU, for example one or more SLMs) 406 functions as a multifocal off-axis Fresnel lens that adds quadratic and linear phase terms to an incident wavefront. The quadratic phase terms can axially shift pixels to the designated depths, while the linear phase terms can laterally shift the centers of pixels to the optical axis. As a result, the pixels of the sub-panel images can be mapped to different axial locations and laterally aligned at the output end. Using SMU technology for shifting portions of the image, the system can use the mapping data to determine where to shift each of the pixels and modify the SMU to shift the pixels to their original locations. The shift functions may be adjusted based on control matrix (e.g., matrix 124 or control matrix generated at line 1130 of FIG. 3).

The light that passes through SMU 406 is collimated by lens 408 to create optically mapped pixels 410 at the different depths. The final output image is collected by eyepiece 412 and displayed to a user's eyeball 414. In some embodiments, a reflective SLM device may also be used to achieve the effect shown FIG. 4.

Figure 5:
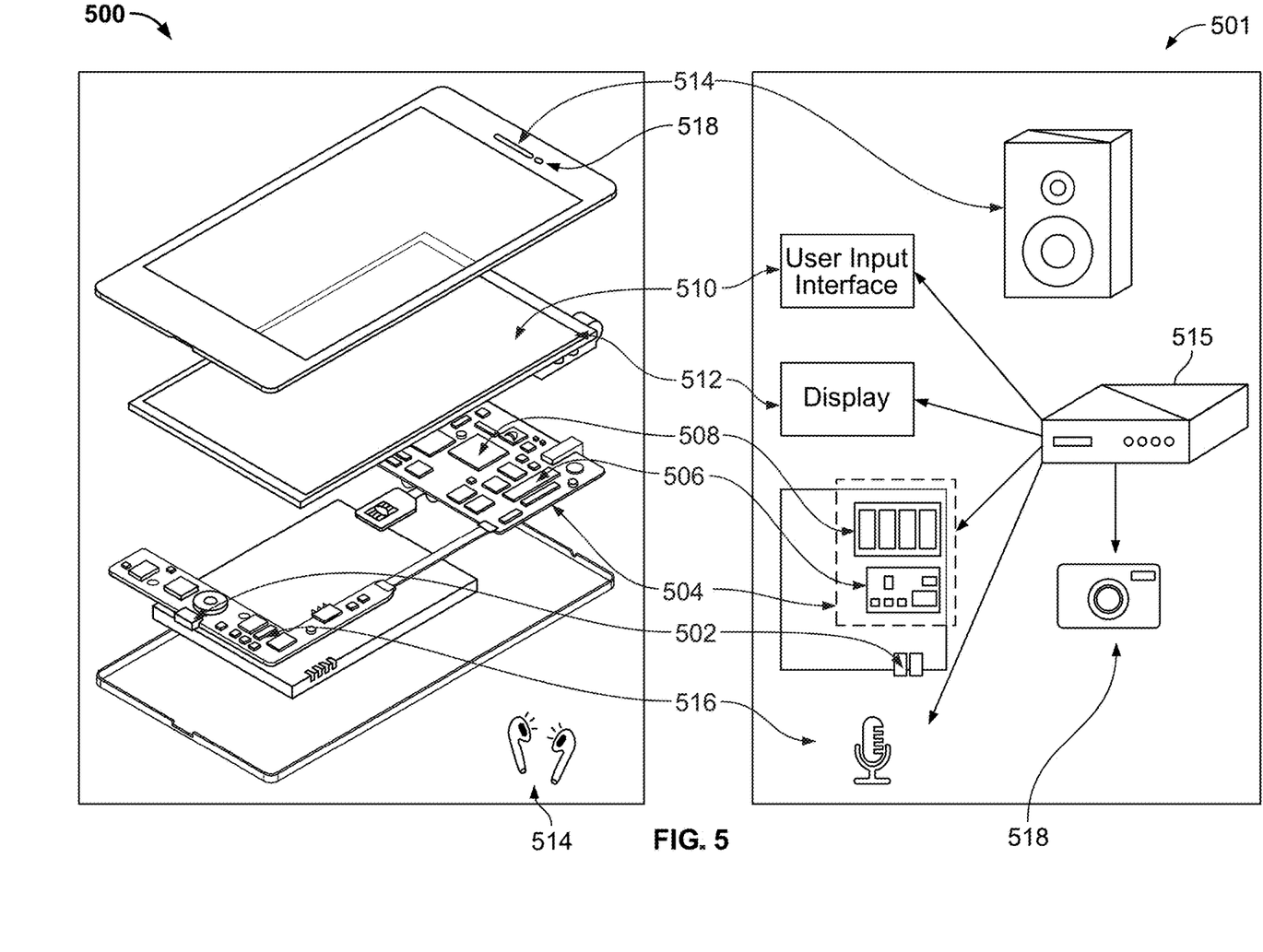
FIG. 5 shows generalized embodiments of illustrative user equipment devices which may perform the functions described herein.
Figure 6:
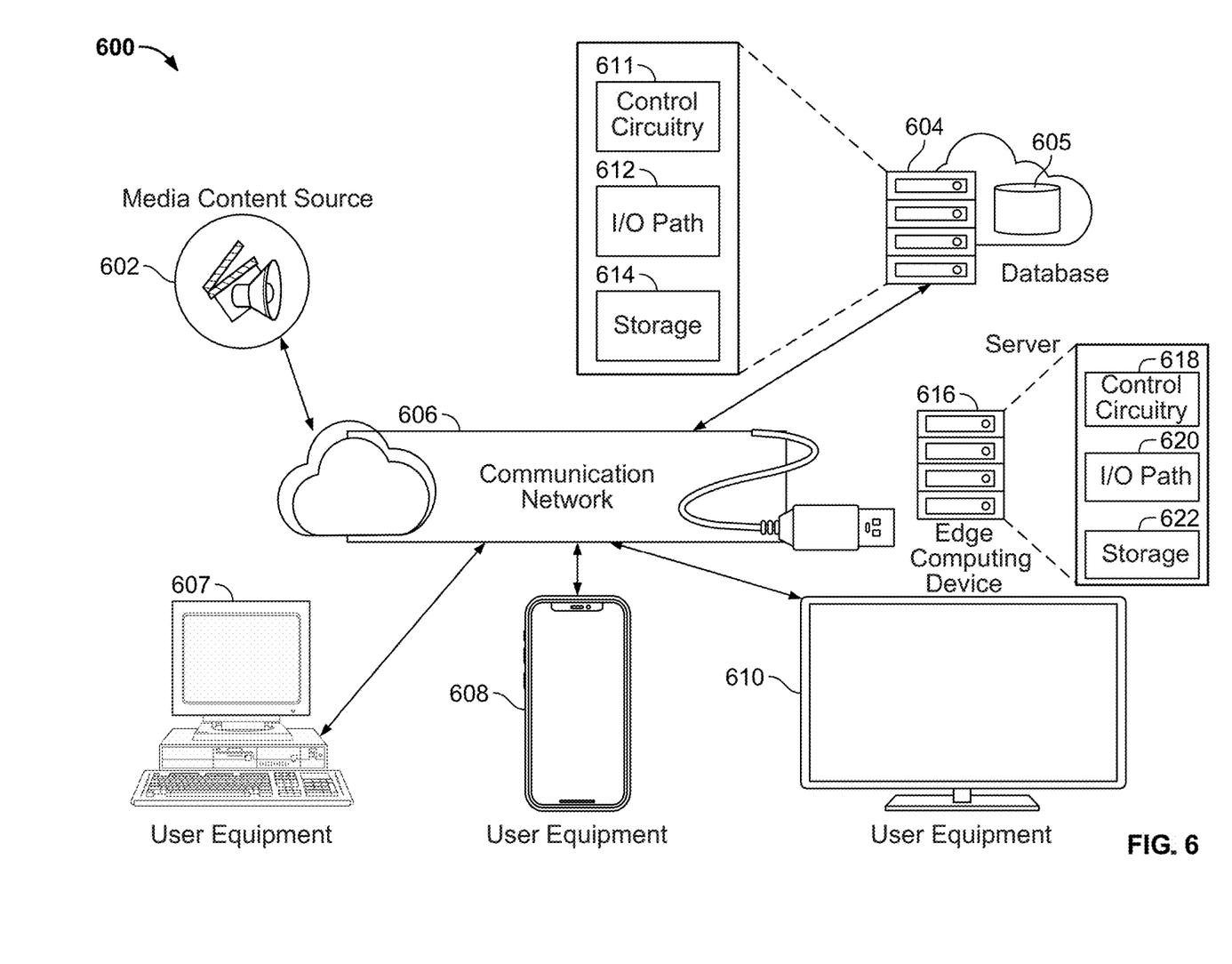
FIG. 6 is a diagram of an illustrative system for encoding/decoding and rendering, in accordance with some embodiments of this disclosure.

FIGS. 5-6 depict illustrative devices, systems, servers, and related hardware for image encoding/decoding. FIG. 5 shows generalized embodiments of illustrative user equipment devices which may perform the functions described herein. User equipment device 500 may be a smartphone device, a tablet, a virtual reality or augmented reality device, or any other suitable device capable of processing video data. In another example, user equipment device 501 may be a user television equipment system or device. User television equipment device 501 may include set-top box 515. Set-top box 515 may be communicatively connected to microphone 516, audio output equipment (e.g., speaker or headphones 514), and display 512. In some embodiments, display 512 may be a television display, computer display or a head mounted display comprising a stack of displays. In some embodiments, display 512 may contain an SLM device as shown in FIGS. 4A and 4B. In some embodiments, set-top box 515 may be communicatively connected to user input interface 510. In some embodiments, user input interface 510 may be a remote-control device. Set-top box 515 may include one or more circuit boards. In some embodiments, the circuit boards may include control circuitry, processing circuitry, and storage (e.g., RAM, ROM, hard disk, removable disk, etc.). In some embodiments, the circuit boards may include an input/output path.

Each one of user equipment device 500 and user equipment device 501 may receive content and data via input/output (I/O) path (e.g., circuitry) 502. I/O path 502 may provide content (e.g., broadcast programming, on-demand programming, internet content, content available over a local area network (LAN) or wide area network (WAN), and/or other content) and data to control circuitry 504, which may comprise processing circuitry 506 and storage 508. Control circuitry 504 may be used to send and receive commands, requests, and other suitable data using I/O path 502, which may comprise I/O circuitry. I/O path 502 may connect control circuitry 504 (and specifically processing circuitry 506) to one or more communications paths (described below). I/O functions may be provided by one or more of these communications paths, but are shown as a single path in FIG. 5 to avoid overcomplicating the drawing. While set-top box 515 is shown in FIG. 6 for illustration, any suitable computing device having processing circuitry, control circuitry, and storage may be used in accordance with the present disclosure. For example, set-top box 515 may be replaced by, or complemented by, a personal computer (e.g., a notebook, a laptop, a desktop), a smartphone (e.g., device 600), a tablet, a network-based server hosting a user-accessible client device, a non-user-owned device, any other suitable device, or any combination thereof.

Control circuitry 504 may be based on any suitable control circuitry such as processing circuitry 506. As referred to herein, control circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 504 executes instructions for the rendering application stored in memory (e.g., storage 508). Specifically, control circuitry 504 may be instructed by the rendering application to perform the functions discussed above and below. In some implementations, processing or actions performed by control circuitry 504 may be based on instructions received from the rendering application.

In client/server-based embodiments, control circuitry 504 may include communications circuitry suitable for communicating with a server or other networks or servers. The rendering application may be a stand-alone application implemented on a device or a server. The rendering application may be implemented as software or a set of executable instructions. The instructions for performing any of the embodiments discussed herein of the rendering application may be encoded on non-transitory computer-readable media (e.g., a hard drive, random-access memory on a DRAM integrated circuit, read-only memory on a BLU-RAY disk, etc.). For example, in FIG. 5, the instructions may be stored in storage 508, and executed by control circuitry 504 of a device 500.

In some embodiments, the rendering application may be a client/server application where only the client application resides on device 500 (e.g., device 104), and a server application resides on an external server (e.g., server 604 and/or server 616). For example, the rendering application may be implemented partially as a client application on control circuitry 504 of device 500 and partially on server 604 as a server application running on control circuitry 611. Server 604 may be a part of a local area network with one or more of devices 500 or may be part of a cloud computing environment accessed via the internet. In a cloud computing environment, various types of computing services for performing searches on the internet or informational databases, providing encoding/decoding capabilities, providing storage (e.g., for a database) or parsing data (e.g., using machine learning algorithms described above and below) are provided by a collection of network-accessible computing and storage resources (e.g., server 604 and/or edge computing device 616), referred to as "the cloud." Device 600 may be a cloud client that relies on the cloud computing capabilities from server 604 to determine whether processing (e.g., at least a portion of virtual background processing and/or at least a portion of other processing tasks) should be offloaded from the mobile device, and facilitate such offloading. When executed by control circuitry of server 604 or 616, the rendering application may instruct control 611 or 618 circuitry to perform processing tasks for the client device and facilitate the encoding/decoding.

Control circuitry 504 may include communications circuitry suitable for communicating with a server, edge computing systems and devices, a table or database server, or other networks or servers. The instructions for carrying out the above-mentioned functionality may be stored on a server (which is described in more detail in connection with FIG. 6). Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communication networks or paths (which is described in more detail in connection with FIG. 6). In addition, communications circuitry may include circuitry that enables peer-to-peer communication of user equipment devices, or communication of user equipment devices in locations remote from each other (described in more detail below).

Memory may be an electronic storage device provided as storage 508 that is part of control circuitry 504. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 508 may be used to store various types of content described herein as well as rendering application data described above. Nonvolatile memory may also be used (e.g., to launch a boot-up routine and other instructions). Cloud-based storage, described in relation to FIG. 5, may be used to supplement storage 508 or instead of storage 508.

Control circuitry 504 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 504 may also include scaler circuitry for upconverting and downconverting content into the preferred output format of user equipment 500. Control circuitry 504 may also include digital-to-analog converter circuitry and analog-to-digital converter circuitry for converting between digital and analog signals. The tuning and encoding circuitry may be used by user equipment device 500, 501 to receive and to display, to play, or to record content. The tuning and encoding circuitry may also be used to receive video encoding/decoding data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 508 is provided as a separate device from user equipment device 500, the tuning and encoding circuitry (including multiple tuners) may be associated with storage 508.

Control circuitry 504 may receive instruction from a user by way of user input interface 510. User input interface 510 may be any suitable user interface, such as a remote control, mouse, trackball, keypad, keyboard, touch screen, touchpad, stylus input, joystick, voice recognition interface, or other user input interfaces. Display 512 may be provided as a stand-alone device or integrated with other elements of each one of user equipment device 500 and user equipment device 501. For example, display 512 may be a touchscreen or touch-sensitive display. In such circumstances, user input interface 510 may be integrated with or combined with display 512. In some embodiments, user input interface 510 includes a remote-control device having one or more microphones, buttons, keypads, any other components configured to receive user input or combinations thereof. For example, user input interface 510 may include a handheld remote-control device having an alphanumeric keypad and option buttons. In a further example, user input interface 510 may include a handheld remote-control device having a microphone and control circuitry configured to receive and identify voice commands and transmit information to set-top box 515.

Audio output equipment 514 may be integrated with or combined with display 512. Display 512 may be one or more of a monitor, a television, a liquid crystal display (LCD) for a mobile device, amorphous silicon display, low-temperature polysilicon display, electronic ink display, electrophoretic display, active matrix display, electro-wetting display, electro-fluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, SLM head mounted display, or any other suitable equipment for displaying visual images. A video card or graphics card may generate the output to the display 512. Audio output equipment 514 may be provided as integrated with other elements of each one of device 500 and equipment 501 or may be stand-alone units. An audio component of videos and other content displayed on display 512 may be played through speakers (or headphones) of audio output equipment 514. In some embodiments, audio may be distributed to a receiver (not shown), which processes and outputs the audio via speakers of audio output equipment 514. In some embodiments, for example, control circuitry 504 is configured to provide audio cues to a user, or other audio feedback to a user, using speakers of audio output equipment 514. There may be a separate microphone 516 or audio output equipment 514 may include a microphone configured to receive audio input such as voice commands or speech. For example, a user may speak letters or words that are received by the microphone and converted to text by control circuitry 504. In a further example, a user may voice commands that are received by a microphone and recognized by control circuitry 504. Camera 518 may be any suitable video camera integrated with the equipment or externally connected. Camera 518 may be a digital camera comprising a charge-coupled device (CCD) and/or a complementary metal-oxide semiconductor (CMOS) image sensor. Camera 518 may be an analog camera that converts to digital images via a video card.

The rendering application may be implemented using any suitable architecture. For example, it may be a stand-alone application wholly-implemented on each one of user equipment device 500 and user equipment device 501. In such an approach, instructions of the application may be stored locally (e.g., in storage 508), and data for use by the application is downloaded on a periodic basis (e.g., from an out-of-band feed, from an Internet resource, or using another suitable approach). Control circuitry 504 may retrieve instructions of the application from storage 508 and process the instructions to provide encoding/decoding functionality and preform any of the actions discussed herein. Based on the processed instructions, control circuitry 504 may determine what action to perform when input is received from user input interface 510. For example, movement of a cursor on a display up/down may be indicated by the processed instructions when user input interface 510 indicates that an up/down button was selected. An application and/or any instructions for performing any of the embodiments discussed herein may be encoded on computer-readable media. Computer-readable media includes any media capable of storing data. The computer-readable media may be non-transitory including, but not limited to, volatile and non-volatile computer memory or storage devices such as a hard disk, floppy disk, USB drive, DVD, CD, media card, register memory, processor cache, Random Access Memory (RAM), etc.

In some embodiments, the rendering application is a client/server-based application. Data for use by a thick or thin client implemented on each one of user equipment device 500 and user equipment device 501 may be retrieved on-demand by issuing requests to a server remote to each one of user equipment device 500 and user equipment device 501. For example, the remote server may store the instructions for the application in a storage device. The remote server may process the stored instructions using circuitry (e.g., control circuitry 504) and generate the displays discussed above and below. The client device may receive the displays generated by the remote server and may display the content of the displays locally on device 500. This way, the processing of the instructions is performed remotely by the server while the resulting displays (e.g., that may include text, a keyboard, or other visuals) are provided locally on device 500. Device 500 may receive inputs from the user via input interface 510 and transmit those inputs to the remote server for processing and generating the corresponding displays. For example, device 500 may transmit a communication to the remote server indicating that an up/down button was selected via input interface 510. The remote server may process instructions in accordance with that input and generate a display of the application corresponding to the input (e.g., a display that moves a cursor up/down). The generated display is then transmitted to device 500 for presentation to the user.

In some embodiments, the rendering application may be downloaded and interpreted or otherwise run by an interpreter or virtual machine (run by control circuitry 504). In some embodiments, the rendering application may be encoded in the ETV Binary Interchange Format (EBIF), received by control circuitry 504 as part of a suitable feed, and interpreted by a user agent running on control circuitry 504. For example, the rendering application may be an EBIF application. In some embodiments, the rendering application may be defined by a series of JAVA-based files that are received and run by a local virtual machine or other suitable middleware executed by control circuitry 504. In some of such embodiments (e.g., those employing MPEG-2 or other digital media encoding schemes), rendering application may be, for example, encoded and transmitted in an MPEG-2 object carousel with the MPEG audio and video packets of a program.

FIG. 6 is a diagram of an illustrative system 600 for encoding/decoding and rendering, in accordance with some embodiments of this disclosure. User equipment devices 607, 608, 610 (e.g., which may correspond to one or more of computing device 500 or 501 may be coupled to communication network 606). Communication network 606 may be one or more networks including the Internet, a mobile phone network, mobile voice or data network (e.g., a 5G, 4G, or LTE network), cable network, public switched telephone network, or other types of communication network or combinations of communication networks. Paths (e.g., depicted as arrows connecting the respective devices to the communication network 606) may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. Communications with the client devices may be provided by one or more of these communications paths but are shown as a single path in FIG. 6 to avoid overcomplicating the drawing.

Although communications paths are not drawn between user equipment devices, these devices may communicate directly with each other via communications paths as well as other short-range, point-to-point communications paths, such as USB cables, IEEE 1394 cables, wireless paths (e.g., Bluetooth, infrared, IEEE 702-11x, etc.), or other short-range communication via wired or wireless paths. The user equipment devices may also communicate with each other directly through an indirect path via communication network 606.

System 600 may comprise media content source 602, one or more servers 604, and one or more edge computing devices 616 (e.g., included as part of an edge computing system, such as, for example, managed by mobile operator 206). In some embodiments, the rendering application may be executed at one or more of control circuitry 611 of server 604 (and/or control circuitry of user equipment devices 607, 608, 610 and/or control circuitry 618 of edge computing device 616). In some embodiments, data structure 300 of FIG. 3, may be stored at database 605 maintained at or otherwise associated with server 604, and/or at storage 622 and/or at storage of one or more of user equipment devices 607, 608, 610.

In some embodiments, server 604 may include control circuitry 611 and storage 614 (e.g., RAM, ROM, Hard Disk, Removable Disk, etc.). Storage 614 may store one or more databases. Server 604 may also include an input/output path 612. I/O path 612 may provide encoding/decoding data, device information, or other data, over a local area network (LAN) or wide area network (WAN), and/or other content and data to control circuitry 611, which may include processing circuitry, and storage 614. Control circuitry 611 may be used to send and receive commands, requests, and other suitable data using I/O path 612, which may comprise I/O circuitry. I/O path 612 may connect control circuitry 611 (and specifically control circuitry) to one or more communications paths.

Control circuitry 611 may be based on any suitable control circuitry such as one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry 611 may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 611 executes instructions for an emulation system application stored in memory (e.g., the storage 614). Memory may be an electronic storage device provided as storage 614 that is part of control circuitry 611.

Edge computing device 616 may comprise control circuitry 618, I/O path 620 and storage 622, which may be implemented in a similar manner as control circuitry 611, I/O path 612 and storage 624, respectively of server 604. Edge computing device 616 may be configured to be in communication with one or more of user equipment devices 607, 608, 610 and video server 604 over communication network 606, and may be configured to perform processing tasks (e.g., encoding/decoding) in connection with ongoing processing of video data. In some embodiments, a plurality of edge computing devices 616 may be strategically located at various geographic locations, and may be mobile edge computing devices configured to provide processing support for mobile devices at various geographical regions.

Figure 7:
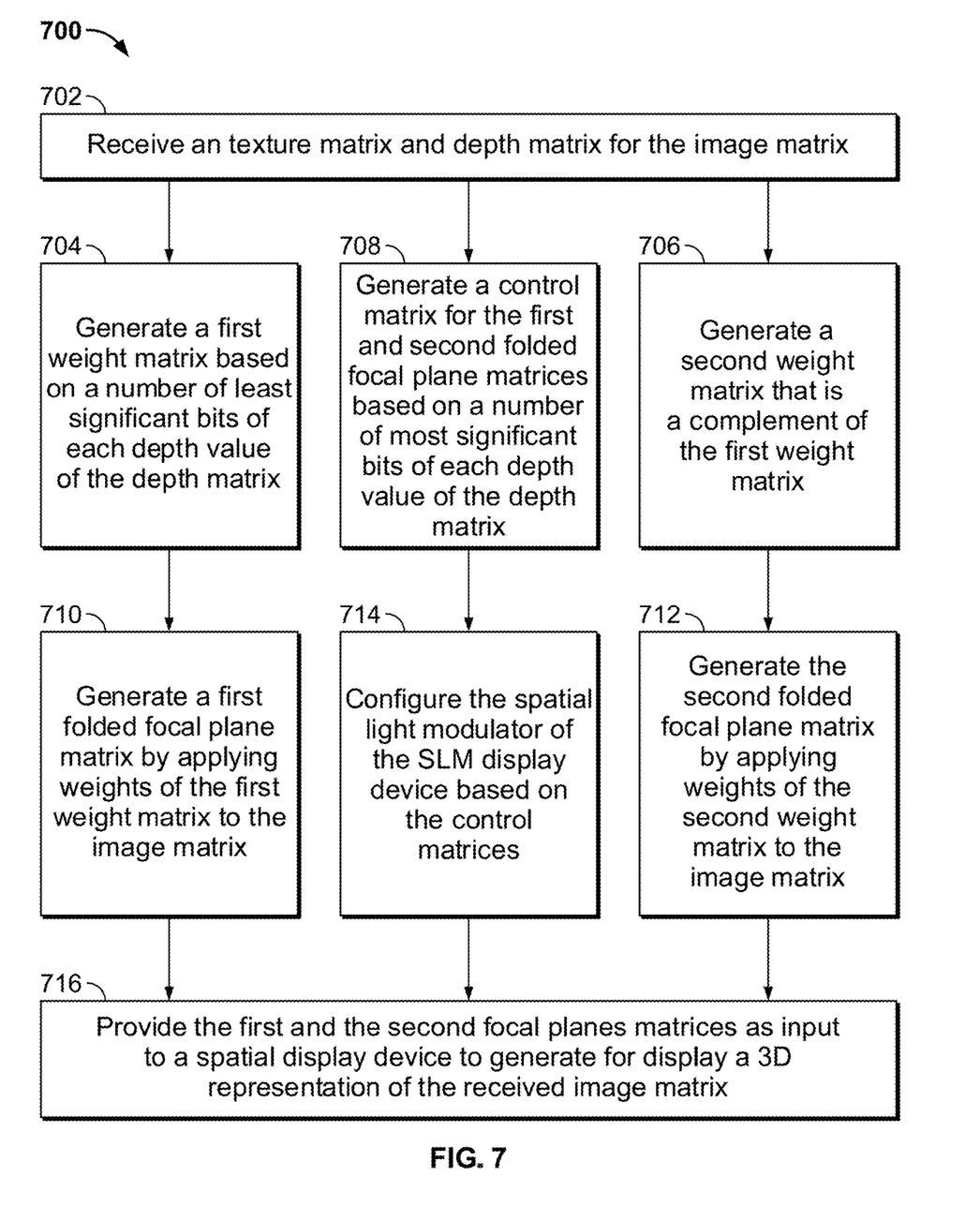
FIG. 7 is a flowchart of an illustrative process for rendering an image, in accordance with some embodiments of this disclosure.

FIG. 7 is a flowchart of an illustrative process 700 for rendering a 3D image. In various embodiments, the individual steps of process 700 may be implemented by one or more components of the devices and systems of FIGS. 5-6. Although the present disclosure may describe certain steps of the process (and of other processes described herein) as being implemented by certain components of the devices and systems of FIGS. 5-6, this is for purposes of illustration only, and it should be understood that other components of the devices and systems of FIGS. 5-6 may implement those steps instead.

At step 702, input/output circuitry of a computing device receives image data defining a texture of an image and depth data for the image (e.g., data 120, 122) for display on a spatial light modulator (SLM) device or stack display device. The input/output circuitry may receive the data from an external device and/or from internal storage.

At step 704, the control circuitry of computing device, generates a first weight matrix based on a number of least significant bits of each depth value of the depth matrix. For example, a first 2 MSBs (in little endian notation) of the depth matrix may be set to zero. At step 706, the control circuitry, generate a second weight matrix that is complement of the first weight matrix. At step 708, the control circuitry generates a control matrix based on a number of most significant bits of each depth value of the depth matrix. For example, the last 6 MSBs (in little endian notation) of the depth matrix may be set to zero.

At step 710, the control circuitry, generates a first folded focal plane matrix by applying weights of the first weight matrix to the texture matrix. For example, this may be done as describe with respect to line 1126 of pseudocode of FIG. 3.

At step 712, the control circuitry generates a second folded focal plane matrix by applying weights of the second weight matrix to the texture matrix. For example, this may be done as describe with respect to line 1127 of pseudocode of FIG. 3.

At step 714, the control circuitry of computing device generates a phase function for a spatial light modulator of the SLM device (e.g., display 512), based at least in part on control matrix generated at step 708, and configures the spatial light modulator of the SLM device in accordance with the generated phase function. At step 716, the control circuitry provides the first and the second focal planes matrices as input to a spatial display device to generate for display a 3D representation of the received texture matrix. For example, light may be generated on two tiled displays according to the first and the second folded focal planes matrices, e.g., as shown in element 402 of FIG. 4. The light may be processed as shown in FIG. 4 to result in 3D image being projected to an eye of a user.

The systems and processes discussed above are intended to be illustrative and not limiting. One skilled in the art would appreciate that the actions of the processes discussed herein may be omitted, modified, combined, and/or rearranged, and any additional actions may be performed without departing from the scope of the invention. More generally, the above disclosure is meant to be exemplary and not limiting. Only the claims that follow are meant to set bounds as to what the present disclosure includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:
1. A method comprising:
   receiving a texture matrix and a corresponding depth matrix;
   generating, based on the texture matrix, a first and second folded focal planes matrices by:

generating a first weight matrix based on a number of least significant bits of each depth value of the depth matrix;

generating a second weight matrix that is a complement of the first weight matrix;

generating the first folded focal plane matrix by applying weights of the first weight matrix to the texture matrix; and generating the second folded focal plane matrix by applying weights of the second weight matrix to the texture matrix; and providing the first and the second folded focal planes matrices to a display device for generating a 3D representation of the received texture matrix.

2. The method of claim 1 wherein applying the weights of the first weight matrix to the texture matrix comprises:

extracting luminance values from the texture matrix;

applying corresponding values of the first weight matrix to adjust corresponding luminance values; and recombining luminance values with color values.

3. The method of claim 1 wherein applying the weights of the second weight matrix to the texture matrix comprises:

extracting luminance values from the texture matrix;

applying corresponding values of the second weight matrix to adjust corresponding luminance values; and recombining luminance values with color values.

4. The method of claim 1, further comprising:

generating a control matrix based on a number of most significant bits of each depth value of the depth matrix; and wherein the display device is configured according to the control matrix.

5. The method of claim 1, wherein providing the first and the second folded focal planes matrices as input causes generation of light rays based on the first and the second focal planes.

6. The method of claim 1, wherein each value of the depth matrix comprises 8 bits;

wherein the number of least significant bits of each depth value of the depth matrix is equal to 6; and wherein the number of most significant bits of each depth value of the depth matrix is equal to 2.

7. The method of claim 1, wherein each value of the depth matrix comprises 8 bits;

wherein the number of least significant bits of each depth value of the depth matrix is equal to 5; and wherein the number of most significant bits of each depth value of the depth matrix is equal to 3.

8. The method of claim 1, wherein the display device comprises a spatial light modulator (SLM).

9. The method of claim 1, wherein the display device comprises a set of stacked displays.

10. The method of claim 1, wherein the display device comprises a head mounted display.

11. A system comprising:

input circuitry configured to:

receive a texture matrix and a corresponding depth matrix; and control circuitry configured to:

generate, based on the texture matrix, a first and second folded focal planes matrices by:

generating a first weight matrix based on a number of least significant bits of each depth value of the depth matrix;

generating a second weight matrix that is a complement of the first weight matrix;

generating the first folded focal plane matrix by applying weights of the first weight matrix to the texture matrix; and generating the second folded focal plane matrix by applying weights of the second weight matrix to the texture matrix; and provide the first and the second folded focal planes matrices to a display device for generating a 3D representation of the received texture matrix.

12. The system of claim 11, wherein the control circuitry is configured to apply the weights of the first weight matrix to the texture matrix by:

extracting luminance values from the texture matrix;

applying corresponding values of the first weight matrix to adjust corresponding luminance values; and recombining luminance values with color values.

13. The system of claim 11 wherein the control circuitry is configured to apply the weights of the second weight matrix to the texture matrix by:

extracting luminance values from the texture matrix;

applying corresponding values of the second weight matrix to adjust corresponding luminance values; and recombining luminance values with color values.

14. The system of claim 11, wherein the control circuitry is configured to:

generate a control matrix based on a number of most significant bits of each depth value of the depth matrix; and wherein the display device is configured according to the control matrix.

15. The system of claim 11, wherein the control circuitry providing the first and the second folded focal planes matrices as input causes generation of light rays based on the first and the second focal planes.

16. The system of claim 11, wherein each value of the depth matrix comprises 8 bits;

wherein the number of least significant bits of each depth value of the depth matrix is equal to 6; and wherein the number of most significant bits of each depth value of the depth matrix is equal to 2.

17. The system of claim 11, wherein each value of the depth matrix comprises 8 bits;

wherein the number of least significant bits of each depth value of the depth matrix is equal to 5; and wherein the number of most significant bits of each depth value of the depth matrix is equal to 3.

18. The system of claim 11, wherein the display device comprises a spatial light modulator (SLM).

19. The system of claim 11, wherein the display device comprises a set of stacked displays.

20. The system of claim 11, wherein the display device comprises a head mounted display.

* * * * *